United States Patent
Kommula (10) Patent No.: US 7,574,508 B1
(45) Date of Patent: Aug. 11, 2009

(54) CANONICAL NAME (CNAME) HANDLING FOR GLOBAL SERVER LOAD BALANCING

(75) Inventor: Sunanda Lakshmi Kommula, San Jose, CA (US)

(73) Assignee: Foundry Networks, Inc., Santa Clara, CA (US)

( * ) Notice: Subject to any disclaimer, the term of this patent is extended or adjusted under 35 U.S.C. 154(b) by 723 days.

(21) Appl. No.: 10/214,921

(22) Filed: Aug. 7, 2002

(51) Int. Cl.
*G06F 15/173* (2006.01)

(52) U.S. Cl. .................................... 709/226

(58) Field of Classification Search ................ 709/226, 709/238–244, 223, 203
See application file for complete search history.

(56) References Cited

U.S. PATENT DOCUMENTS

| | | | |
|---|---|---|---|
| 5,031,094 A | 7/1991 | Toegel et al. | 364/200 |
| 5,359,593 A | 10/1994 | Derby et al. | 370/17 |
| 5,948,061 A | 9/1999 | Merriman et al. | 709/219 |
| 5,951,634 A | 9/1999 | Sitbon et al. | 709/105 |
| 6,006,269 A | 12/1999 | Phaal | |
| 6,006,333 A | 12/1999 | Nielsen | |
| 6,092,178 A | 7/2000 | Jindal et al. | 712/27 |
| 6,112,239 A | 8/2000 | Kenner et al. | 709/224 |
| 6,115,752 A | 9/2000 | Chauhan | 709/241 |
| 6,128,279 A | 10/2000 | O'Neil et al. | 370/229 |
| 6,128,642 A | 10/2000 | Doraswamy et al. | 709/201 |
| 6,167,445 A | 12/2000 | Gai et al. | |
| 6,167,446 A | 12/2000 | Lister et al. | 709/223 |
| 6,182,139 B1 | 1/2001 | Brendel | 709/226 |
| 6,195,691 B1 | 2/2001 | Brown | |
| 6,233,604 B1 | 5/2001 | Van Horne et al. | 709/203 |
| 6,286,039 B1 | 9/2001 | Van Horne et al. | 709/221 |
| 6,286,047 B1 * | 9/2001 | Ramanathan et al. | 709/224 |
| 6,324,580 B1 | 11/2001 | Jindal et al. | 709/228 |
| 6,327,622 B1 | 12/2001 | Jindal et al. | |
| 6,336,137 B1 | 1/2002 | Lee et al. | |
| 6,381,627 B1 | 4/2002 | Kwan et al. | 709/201 |
| 6,389,462 B1 | 5/2002 | Cohen et al. | 709/218 |
| 6,393,473 B1 | 5/2002 | Chu | |
| 6,427,170 B1 | 7/2002 | Sitaraman et al. | 709/226 |

(Continued)

OTHER PUBLICATIONS

Albitz, P. et al., "DNS and BIND in a Nutshell," O'Reilly & Associates, Sebastopol, CA, 1992, pp. 214-215.

(Continued)

*Primary Examiner*—Patrice Winder
*Assistant Examiner*—Thomas Duong
(74) *Attorney, Agent, or Firm*—Schwabe, Williamson & Wyatt, P.C.

(57) ABSTRACT

Canonical name (CNAME) handling is performed in a system configured for global server load balancing (GSLB), which orders IP addresses into a list based on a set of performance metrics. When the GSLB switch receives a reply from an authoritative DNS server, the GSLB switch scans the reply for CNAME records. If a CNAME record is detected and it points to a host name configured for GSLB, then a GSLB algorithm is applied to the reply. This involves identifying the host name (pointed to by the CNAME record) in the reply and applying the metrics to the list of returned IP addresses corresponding to that host name, to reorder the list to place the "best" IP address at the top. If the CNAME record in the reply points to a host name that is not configured for GSLB, then the GSLB sends the reply unaltered to the inquiring client.

29 Claims, 3 Drawing Sheets

U.S. PATENT DOCUMENTS

| | | | |
|---|---|---|---|
| 6,434,118 B1 | 8/2002 | Kirschenbaum | |
| 6,438,652 B1 | 8/2002 | Jordan et al. | 711/120 |
| 6,446,121 B1 | 9/2002 | Shah et al. | |
| 6,449,657 B2 | 9/2002 | Stanbach, Jr. et al. | 709/245 |
| 6,470,389 B1 | 10/2002 | Chung et al. | 709/227 |
| 6,480,508 B1 | 11/2002 | Mwikalo et al. | 370/475 |
| 6,490,624 B1 | 12/2002 | Sampson et al. | |
| 6,549,944 B1 | 4/2003 | Weinberg et al. | 709/224 |
| 6,578,066 B1* | 6/2003 | Logan et al. | 718/105 |
| 6,606,643 B1 | 8/2003 | Emens et al. | 709/203 |
| 6,611,861 B1 | 8/2003 | Schairer et al. | |
| 6,681,232 B1 | 1/2004 | Sistanizadeh et al. | 707/104.1 |
| 6,681,323 B1 | 1/2004 | Fontanesi et al. | 713/1 |
| 6,691,165 B1 | 2/2004 | Bruck et al. | |
| 6,745,241 B1 | 6/2004 | French et al. | 709/221 |
| 6,760,775 B1 | 7/2004 | Anerousis | |
| 6,772,211 B2 | 8/2004 | Lu et al. | |
| 6,789,125 B1 | 9/2004 | Aviani et al. | 709/238 |
| 6,826,198 B2 | 11/2004 | Turina et al. | 370/467 |
| 6,839,700 B2 | 1/2005 | Doyle et al. | |
| 6,850,984 B1 | 2/2005 | Kalkunte et al. | 709/229 |
| 6,874,152 B2 | 3/2005 | Vermeire et al. | |
| 6,879,995 B1 | 4/2005 | Chinta et al. | 709/204 |
| 6,898,633 B1 | 5/2005 | Lyndersay et al. | 709/226 |
| 6,901,081 B1 | 5/2005 | Ludwig | |
| 6,928,485 B1 | 8/2005 | Krishnamurthy et al. | |
| 6,963,914 B1* | 11/2005 | Breitbart et al. | 709/226 |
| 6,963,917 B1 | 11/2005 | Callis et al. | 709/227 |
| 6,985,956 B2* | 1/2006 | Luke et al. | 709/229 |
| 6,987,763 B2 | 1/2006 | Rochberger et al. | 370/389 |
| 6,996,615 B1 | 2/2006 | McGuire | 709/226 |
| 6,996,616 B1* | 2/2006 | Leighton et al. | 709/226 |
| 7,000,007 B1 | 2/2006 | Valenti | 709/219 |
| 7,020,698 B2 | 3/2006 | Andrews et al. | 709/223 |
| 7,020,714 B2 | 3/2006 | Kalyanaraman et al. | |
| 7,028,083 B2 | 4/2006 | Levine et al. | |
| 7,032,010 B1 | 4/2006 | Swildens et al. | 709/219 |
| 7,032,031 B2* | 4/2006 | Jungck et al. | 709/246 |
| 7,036,039 B2* | 4/2006 | Holland | 714/5 |
| 7,058,717 B2 | 6/2006 | Chao et al. | |
| 7,062,642 B1 | 6/2006 | Langrind et al. | |
| 7,082,102 B1 | 7/2006 | Wright | |
| 7,086,061 B1 | 8/2006 | Joshi et al. | 718/105 |
| 7,089,293 B2* | 8/2006 | Grosner et al. | 709/217 |
| 7,114,008 B2* | 9/2006 | Jungck et al. | 709/246 |
| 7,136,932 B1* | 11/2006 | Schneider | 709/245 |
| 7,139,242 B2 | 11/2006 | Bays | |
| 7,177,933 B2 | 2/2007 | Foth | |
| 7,185,052 B2* | 2/2007 | Day | 709/203 |
| 7,197,547 B1 | 3/2007 | Miller et al. | |
| 7,206,806 B2 | 4/2007 | Pineau | |
| 7,225,272 B2* | 5/2007 | Kelley et al. | 709/245 |
| 7,240,015 B1 | 7/2007 | Karmouch et al. | |
| 7,240,100 B1* | 7/2007 | Wein et al. | 709/214 |
| 7,254,626 B1 | 8/2007 | Kommula et al. | |
| 7,257,642 B1 | 8/2007 | Bridger et al. | |
| 7,260,645 B2 | 8/2007 | Bays | |
| 7,296,088 B1 | 11/2007 | Padmanabhan et al. | |
| 7,321,926 B1 | 1/2008 | Zhang et al. | |
| 7,330,908 B2* | 2/2008 | Jungck | 709/246 |
| 7,383,288 B2* | 6/2008 | Miloushev et al. | 707/200 |
| 7,423,977 B1 | 9/2008 | Joshi et al. | |
| 7,454,500 B1 | 11/2008 | Hsu et al. | |
| 2001/0049741 A1 | 12/2001 | Skene et al. | |
| 2001/0052016 A1* | 12/2001 | Skene et al. | 709/226 |
| 2002/0026551 A1 | 2/2002 | Kamimaki et al. | 710/260 |
| 2002/0038360 A1 | 3/2002 | Andrews et al. | 709/223 |
| 2002/0055939 A1 | 5/2002 | Nardone et al. | |
| 2002/0059170 A1 | 5/2002 | Vange | |
| 2002/0059464 A1 | 5/2002 | Hata et al. | |
| 2002/0062372 A1 | 5/2002 | Hong et al. | 709/225 |
| 2002/0078233 A1* | 6/2002 | Biliris et al. | 709/238 |
| 2002/0087722 A1 | 7/2002 | Datta et al. | |
| 2002/0091840 A1 | 7/2002 | Pulier et al. | 709/228 |
| 2002/0112036 A1 | 8/2002 | Bohannon et al. | 709/220 |
| 2002/0120743 A1 | 8/2002 | Shabtay et al. | 709/226 |
| 2002/0120763 A1* | 8/2002 | Miloushev et al. | 709/230 |
| 2002/0124096 A1 | 9/2002 | Loguinov et al. | |
| 2002/0133601 A1 | 9/2002 | Kennamer et al. | 709/229 |
| 2002/0150048 A1 | 10/2002 | Ha et al. | |
| 2002/0154600 A1 | 10/2002 | Ido et al. | |
| 2002/0188862 A1* | 12/2002 | Trethewey et al. | 713/201 |
| 2002/0194324 A1 | 12/2002 | Guha | |
| 2002/0194335 A1* | 12/2002 | Maynard | 709/225 |
| 2003/0018796 A1 | 1/2003 | Chou et al. | |
| 2003/0031185 A1 | 2/2003 | Kikuchi et al. | |
| 2003/0035430 A1 | 2/2003 | Islam et al. | 370/401 |
| 2003/0065711 A1 | 4/2003 | Acharya et al. | 709/203 |
| 2003/0065763 A1 | 4/2003 | Swildens et al. | 709/224 |
| 2003/0105797 A1 | 6/2003 | Dolev et al. | 709/105 |
| 2003/0115283 A1* | 6/2003 | Barbir et al. | 709/217 |
| 2003/0135509 A1* | 7/2003 | Davis et al. | 707/100 |
| 2003/0154239 A1* | 8/2003 | Davis et al. | 709/201 |
| 2003/0210686 A1 | 11/2003 | Terrell et al. | 370/389 |
| 2003/0210694 A1 | 11/2003 | Jayaraman et al. | 370/392 |
| 2003/0229697 A1 | 12/2003 | Borella | |
| 2004/0019680 A1 | 1/2004 | Chao et al. | |
| 2004/0024872 A1* | 2/2004 | Kelley et al. | 709/225 |
| 2004/0039847 A1* | 2/2004 | Persson et al. | 709/250 |
| 2004/0064577 A1 | 4/2004 | Dahlin et al. | |
| 2004/0194102 A1* | 9/2004 | Neerdaels | 718/100 |
| 2004/0249939 A1 | 12/2004 | Amini et al. | |
| 2004/0249971 A1 | 12/2004 | Klinker | |
| 2005/0021883 A1 | 1/2005 | Shishizuka et al. | 710/20 |
| 2005/0033858 A1 | 2/2005 | Swildens et al. | 709/232 |
| 2005/0086295 A1 | 4/2005 | Cunningham et al. | 709/203 |
| 2005/0149531 A1* | 7/2005 | Srivastava | 707/10 |
| 2005/0169180 A1 | 8/2005 | Ludwig | |
| 2005/0286416 A1 | 12/2005 | Shimonishi et al. | |
| 2006/0020715 A1* | 1/2006 | Jungck | 709/246 |
| 2006/0036743 A1 | 2/2006 | Deng et al. | |
| 2007/0168547 A1 | 7/2007 | Krywaniuk | |

OTHER PUBLICATIONS

Albitz, P., et al., "DNS and BIND in a Nutshell," O'Reilly & Associates, Sebastopol, CA, 1992, pp. 214-215.

Alteon Systems, "Alteon WebSystems Introduces New Layer 4+ Switching Technology that Speeds User Access to Internet Servers," Dec. 7, 1998, retrieved Nov. 5, 2002, from http://web.archive.org/web/20000919190409/www.alteonwebsystems.com/press/releases/1998/120798.asp, pp. 1-4.

Alteon WebSystems, Inc., "Enhancing Web User Experience with Global Server Load Balancing," Jun. 1999, 8 pages.

Krapf, E., "Alteon's Global Server Load Balancing," *Business Communications Review*, Jan. 1999, p. 60, retrieved Oct. 25, 2002, from http://www.bcr.com/bcrmag/1999/01/p60.asp, 3 pages.

Nortel Networks, "Alteon Personal Content Director," © 2001, can be retrieved from http://www.nortelnetworks.com/personalinternet, 4 pages.

IBM Corp., *IBM WebSphere Performance Pack: Load Balancing with IBM SecureWay Network Dispatcher*, First Edition, Chapters 1, 2, 4, and 8, Oct. 1999.

IBM Corp., *SecureWay® Network Dispatcher: User's Guide—Version 2.1 for AIX, Solaris, and Windows NT*, Third Edition, Chapters 3, 4, 9, 10, 11, and Appendices C & E, Mar. 1999.

Yerxa, G., "ACElerate on Fast Track for Load-Balancing," Mar. 8, 1999, retrieved Nov. 5, 2002, from http://www.networkcomputing.com/1005/1005sp2.html, pp. 1-4.

Bestavros, Azer, "WWW Traffic Reduction and Load Balancing through Server-Based Caching," *IEEE Concurrency*, pp. 56-67, Jan.-Mar. 1997.

Paul, Arindam et al., "Balancing Web Server Load for Adaptable Video Distribution," *IEEE* pp. 469-476, 2000.

Alteon WebSystems, "PCD White Paper," *AlteonWebSystems*, pp. 1-8, Mar. 2001.

Cardellini, V., et al., "Dynamic Load Balancing on Web-server Systems," *IEEE Internet Computing*, 3(3):28-39, May-Jun. 1999.

Foundry Networks, Inc., "Server Load Balancing in Today's Web-enabled Enterprises," *White Paper*, pp. 1-10, Apr. 2002.

Genova, Z., et al., "Challenges in URL Switching for Implementing Globally Distributed Web Sites," *IEEE*, pp. 89-94, 2000.

U.S. Appl. No. 09/670,487, filed Sep. 26, 2000, Hsu et al.

U.S. Appl. No. 10/206,580, filed Jul. 25, 2002, Kommula et al.

U.S. Appl. No. 10/305,823, filed Nov. 27, 2002, Joshi et al.

U.S. Appl. No. 10/376,903, filed Feb. 28, 2003, Kommula.

U.S. Appl. No. 10/377,364, filed Feb. 28, 2003, Kommula.

U.S. Appl. No. 10/674,627, filed Sep. 29, 2003, Joshi.

U.S. Appl. No. 10/839,919, filed May 6, 2004, Joshi.

U.S. Appl. No. 10/840,496, filed May 6, 2004, Joshi.

U.S. Appl. No. 10/924,552, filed Aug. 23, 2004, Joshi.

U.S. Appl. No. 11/429,177, filed May 5, 2006, Joshi et al.

U.S. Appl. No. 11/707,697, filed Feb. 16, 2007, Kommula et al.

U.S. Appl. No. 60/347,481, filed Jan. 11, 2002, Tsimelzon et al.

Genova, Z., et al., "Challenges in URL Switching for Implementing Globally Distributed Web Sites," Department of Computer Science and Engineering, University of South Florida, pp. 1-9, Aug. 11, 2000.

Cisco Document, "Configuring the CSS Domain Name Service,", posted on Dec. 2000, Cisco Systems Inc., http://www.ciscosystems.com, pp. 1-13.

Venkataramani, A., et al., "TCP Nice: A Mechanism for Background Transfer," Proceedings of the Fifth Symposium on Operating Systems Design and Implementation (OSDI'02), ISBN:1-931971-06-4, 329-343, 2002.

Joshi, "Smoothing Algorithm for Round Trip Time (RTT) Measurements," assigned U.S. Appl. No. 12/177,021, filed Jul. 21, 2008.

Hsu et al., "Global Server Load Balancing," U.S. Appl. No. 11/741,480, filed Apr. 27, 2007.

Hsu et al., "Global Server Load Balancing," U.S. Appl. No. 12/272,618, filed Nov. 17, 2008.

\* cited by examiner

CANONICAL NAME (CNAME) HANDLING FOR GLOBAL SERVER LOAD BALANCING

BACKGROUND OF THE INVENTION

1. Field of the Invention

The disclosure invention relates generally to load balancing among servers. More particularly but not exclusively, the present disclosure relates to handling of canonical names (CNAMES) in load balancing systems that provide the address of a server expected to serve the client with a high performance in a given application.

2. Description of the Related Art

Under the TCP/IP protocol, when a client provides a symbolic name ("URL") to request access to an application program or another type of resource, the host name portion of the URL needs to be resolved into an IP address of a server for that application program or resource. For example, the URL (e.g., http://www.foundrynet.com/index.htm) includes a host name portion www.foundrynet.com that needs to be resolved into an IP address. The host name portion is first provided by the client to a local name resolver, which then queries a local DNS server to obtain a corresponding IP address. If a corresponding IP address is not locally cached at the time of the query, or if the "time-to-live" (TTL) of a corresponding IP address cached locally has expired, the DNS server then acts as a resolver and dispatches a recursive query to another DNS server. This process is repeated until an authoritative DNS server for the domain (e.g., foundrynet.com, in this example) is reached. The authoritative DNS server returns one or more IP addresses, each corresponding to an address at which a server hosting the application ("host server") under the host name can be reached. These IP addresses are propagated back via the local DNS server to the original resolver. The application at the client then uses one of the IP addresses to establish a TCP connection with the corresponding host server. Each DNS server caches the list of IP addresses received from the authoritative DNS for responding to future queries regarding the same host name, until the TTL of the IP addresses expires.

To provide some load sharing among the host servers, many authoritative DNS servers use a simple round-robin algorithm to rotate the IP addresses in a list of responsive IP addresses, so as to distribute equally the requests for access among the host servers.

The conventional method described above for resolving a host name to its IP addresses has several shortcomings. First, the authoritative DNS does not detect a server that is down. Consequently, the authoritative DNS server continues to return a disabled host server's IP address until an external agent updates the authoritative DNS server's resource records. Second, when providing its list of IP addresses, the authoritative DNS sever does not take into consideration the host servers' locations relative to the client. The geographical distance between the server and a client is a factor affecting the response time for the client's access to the host server. For example, traffic conditions being equal, a client from Japan could receive better response time from a host server in Japan than from a host server in New York. Further, the conventional DNS algorithm allows invalid IP addresses (e.g., that corresponding to a downed server) to persist in a local DNS server until the TTL for the invalid IP address expires.

One technique to address these shortcomings is a global server load balancing system provided by Foundry Networks, Inc. of Santa Clara, Calif. As one example, Foundry provides the ServerIron product to add intelligence to authoritative DNS servers by serving as a proxy to these servers. The ServerIron has a global server load balancing (GSLB) feature that intelligently uses health-checks and other methods to assess the availability and responsiveness of the host sites in the DNS reply. When necessary, the ServerIron exchanges the IP address at the top of the address list returned by the authoritative DNS with another IP address selected from the list, based on a set of performance metrics indicative of which particular host server may provide the optimum access. Thus, the GSLB feature ensures that a client always receives a DNS reply for a host site that is available and is the best choice among the available hosts. Example embodiments for global server load balancing are disclosed in U.S. application Ser. No. 09/670,487, entitled "GLOBAL SERVER LOAD BALANCING," filed Sep. 26, 2000, assigned to the same assignee as the present application, and which is incorporated herein by reference its entirety.

Canonical names (CNAMEs) are one of the different types of DNS resource records that reside on the authoritative DNS server. A CNAME is used to indicate that the resource record is an alias for another address record (or "A record") on the authoritative DNS server. That is, a CNAME refers to (e.g., maps to) another domain name (A record) instead of mapping to an IP address. When the authoritative DNS server looks up a name and finds a CNAME record, it replaces the name with the canonical name and looks up the new name. Typically, on the authoritative DNS server, there is one or more CNAME records pointing to an address record, which in turn points to one or more IP addresses. For example, the authoritative DNS server can have the A record www.foundrynet.com and the CNAME records www1.foundrynet.com, www2.foundrynet.com, www3.foundrynet.com, all pointing to the A record www.foundrynet.com. Thus, while there may be potentially hundreds to thousands of aliases/CNAMEs associated with a particular domain name, they nevertheless "share" the same IP addresses since the CNAMEs map to a common A record corresponding to the IP addresses.

In one GSLB implementation, when an authoritative DNS server resolves a host name portion in a query and returns one or more IP addresses, the GSLB switch (such as a ServerIron configured for GSLB in a manner described above) applies the GSLB algorithm to the IP address list and returns a ranked list of IP addresses to the inquirer, provided the respective host name is configured on the GSLB switch. If a host name is not configured for GSLB, the GSLB switch does not apply the GSLB algorithm on DNS replies (received from the authoritative DNS server) pertaining to that host name. This behavior provides flexibility to a system administrator, to selectively load-balance only the required domains and hosts. However, for systems that have huge lists of CNAME records on their DNS servers and that wish to use GSLB to load balance all of these hosts, configuration of each and every one of the hosts on the GSLB switch is needed. This creates a significant amount of configuration overhead for systems that have large numbers of CNAMEs.

BRIEF SUMMARY OF THE INVENTION

One aspect of the present invention provides a method for a load balancing system. The method includes receiving a communication regarding a domain name. The communication is checked to detect a canonical name (CNAME). If the CNAME is detected, a server load balancing algorithm is applied to a list of network addresses associated with the communication.

DETAILED DESCRIPTION

Embodiments of canonical name (CNAME) handling (or other CNAME processing) in the context of load balancing among servers are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, one embodiment of the invention provides a method for CNAME handling in a system configured for global server load balancing (GSLB), which orders IP addresses into a list based on a set of performance metrics. An automatic CNAME detection feature is provided that reduces (or eliminates) the need to configure each and every one of the CNAMES in a GSLB switch, thereby providing relief from the significant configuration overhead.

According to the operation of one embodiment, the CNAME detection feature is disabled by default, and can be turned on globally for all relevant zones eligible for GSLB. Once the CNAME detection feature is enabled in a GSLB switch, when the GSLB switch receives a DNS reply from an authoritative DNS server, the GSLB switch scans the DNS reply for CNAME records. If there is a CNAME record identified in the DNS reply and it points to a host name that is configured for GSLB, the GSLB switch applies a GSLB algorithm on the reply. In an embodiment, this involves identifying the host name (pointed to by the CNAME record) in the reply and applying a set of performance metrics to the list of returned IP addresses corresponding to that host name, to place the "best" or optimum IP address at the top of the list before sending the list to the inquiring client. If the CNAME record in the reply points to a host name that is not configured for GSLB, the GSLB, sends the reply unaltered (e.g., does not apply the GSLB algorithm to the reply) to the inquiring client, since the host name was not intended to be subject to GSLB by the system administrator.

Figure 1:
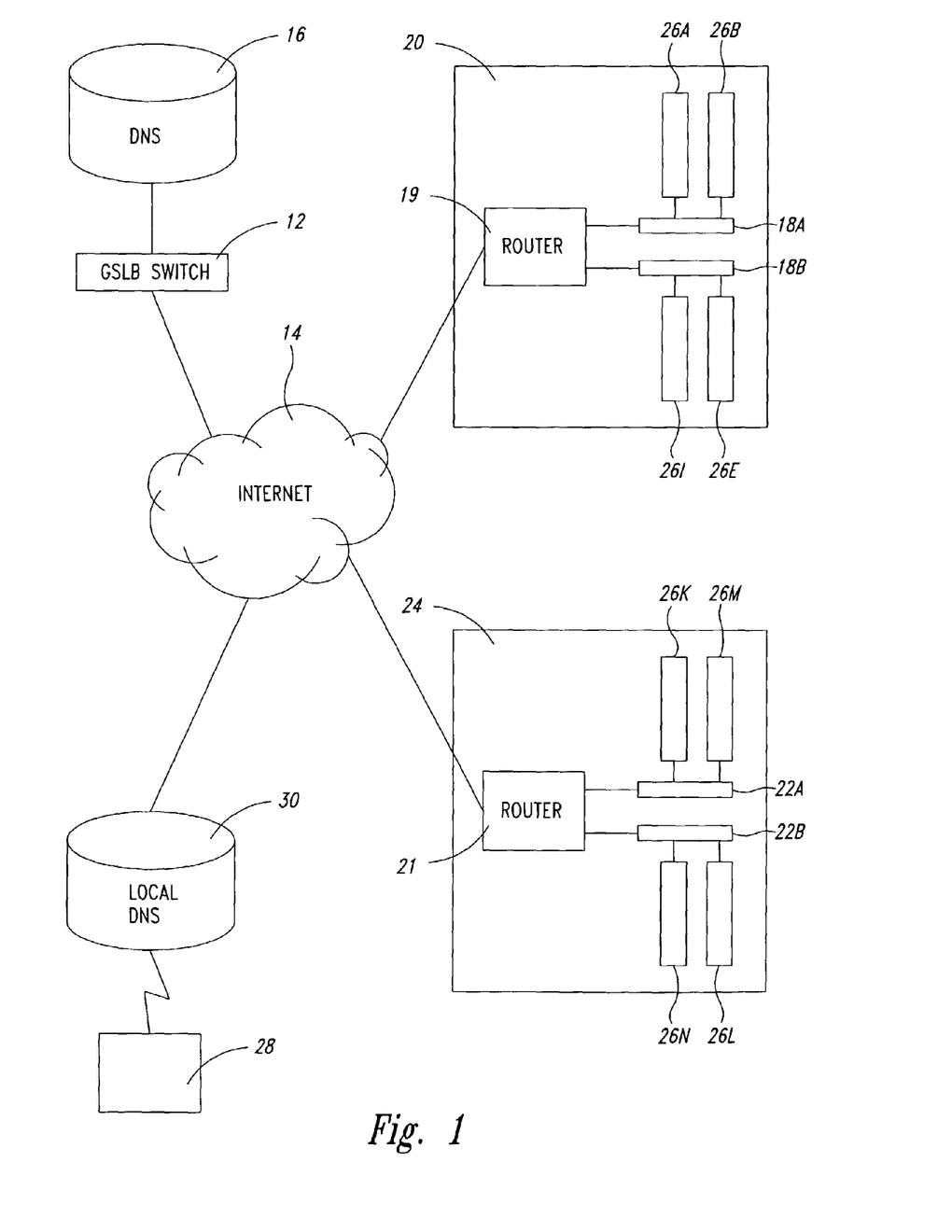
FIG. 1 illustrates a global server load-balancing configuration with which one embodiment of the invention may be implemented.

FIG. 1 illustrates one example global server load-balancing configuration with which an embodiment of the invention may be used. As shown in FIG. 1, GSLB switch 12 is connected to Internet 14 and acts as a proxy to an authoritative Domain Name System (DNS) server 16 for the domain "foundrynet.com" (for example). That is, while the actual DNS service is provided by DNS server 16, the IP address known to the rest of the Internet 14 for the authoritative DNS server of the domain "foundrynet.com" is a virtual IP (VIP) address configured on GSLB switch 12. Of course, DNS server 16 can also act simultaneously as an authoritative DNS for other domains. GSLB switch 12 communicates, via Internet 14, with site switches 18A and 18B at site 20, site switches 22A and 22B at site 24, and any other similarly configured site switches. Site switch 18A, 18B, 22A and 22B are shown, for example, connected to routers 19 and 21 respectively and to servers 26A, . . . , 26I, . . . 26N. Some or all of servers 26A, . . . , 26I, . . . , 26N may host application server programs (e.g., http and ftp) relevant to the present invention. These host servers are reached through site switches 18A, 18B, 22A and 22B using one or more virtual IP addresses configured at the site switches, which act as proxies to the host servers. A suitable switch for implementing either GSLB switch 12 or any of site switches 18A, 18B, 22A and 22B is the "Serverlron" product available from Foundry Networks, Inc.

FIG. 1 also shows client program 28 connected to Internet 14, and communicates with local DNS server 30. When a browser on client 28 requests a web page, for example, using a Universal Resource Locator (URL), such as http://www.foundrynet.com/index.htm, a query is sent to local DNS server 30 to resolve the symbolic host name www.foundrynet.com to an IP address of a host server. The client program receives from DNS server 30 a list of IP addresses corresponding to the resolved host name. This list of IP addresses is either retrieved from local DNS server 30's cache, if the TTL of the responsive IP addresses in the cache has not expired, or obtained from GSLB switch 12, as a result of a recursive query. Unlike the prior art, however, this list of IP addresses is ordered by GSLB switch 12, provided that the host name www.foundrynet.com is configured on GSLB switch 12, based on performance metrics, as described in further detail in U.S. application Ser. No. 09/670,487 referenced above, and in U.S. application Ser. No. 10/206.580, entitled "GLOBAL SERVER LOAD BALANCING," filed Jul. 25, 2002, with inventors Sunanda L. Kommula et al., and assigned to the same assignee as the present application (and disclosing embodiments of a connection-load metric for GSLB). For the sake of brevity, these various performance metrics and the manner in which they are used in a GSLB algorithm to identify best sites in a list of IP addresses are summarized and not described in detail herein. Such additional details may be found in these co-pending applications.

For purposes of illustration, it is assumed that there may be one or more CNAME or alias records at the authoritative DNS server 16, with such CNAME records pointing to the host name that has been configured for GSLB in the GSLB switch 12. For example, there may be CNAME records www1.foundrynet.com, www2.foundrynet.com, and www3.foundrynet.com that all point to the A record www.foundrynet.com, which in turn corresponds to one or more IP addresses. In this example, the CNAME records and the A record share a common domain name or zone (e.g., foundrynet.com) but have different hosts (e.g., www, www1, www2, and www3).

A user at the client 28 may enter www1.foundrynet.com in his browser, for instance if the www1 host is what is made available to his geographical area, and then receive IP addresses corresponding to the A record www.foundrynet.com to which the CNAME www1.foundrynet.com maps. It is appreciated that other formats for CNAME records may be used in accordance with an embodiment of the invention. For example, there may be CNAME records having the formats www.foundrynetworks.com, www.foundrynet.org, www17.foundrynetworks.com, or others that all map to the A record www.foundrynet.com. In another implementation, CNAME records may map to ftp.foundrynet.com (for ftp applications). For the sake of brevity, the various techniques that may be suitable to create CNAME records in the authoritative DNS server 16, configure a system to operate with CNAME records, return CNAME records pointing to an A record as part of a DNS reply, and other CNAME implementations are not described in further detail herein because such techniques would be familiar to those skilled in the art having the benefit of this disclosure. Rather, the focus of this disclosure will be on detection and processing of CNAMES in conjunction with GSLB.

In the remainder of this detailed description, for the purpose of illustrating embodiments of the present invention only, the list of IP addresses returned are assumed to be the virtual IP addresses configured on the proxy servers at switches 18A, 18B, 22A and 22B (sites 20 and 24). In one embodiment when the authoritative DNS server 16 resolves a host name in a query and returns one or more IP addresses, the GSLB switch 12 determines (using the performance metrics) which site switch would provide the best expected performance (e.g., response time) for client 28 and returns the IP address list with a virtual IP address configured at that site switch placed at the top. (Other forms of ranking or weighting the IP addresses in the list can also be possible.) Client program 28 can receive the ordered list of IP addresses, and typically selects the first IP address on the list to access the corresponding host server.

Figure 3:
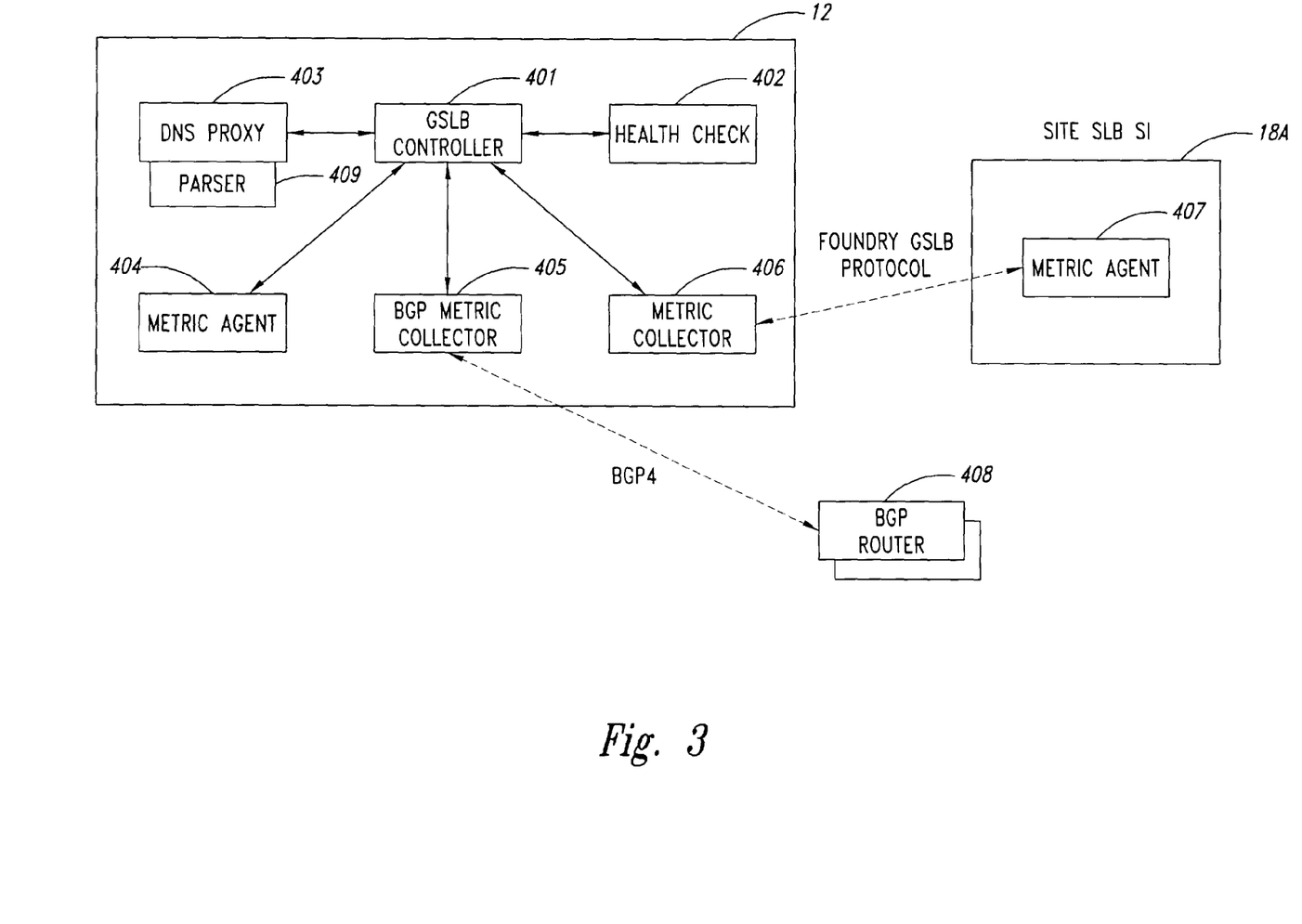
FIG. 3 is a block diagram showing the functional modules of a GSLB switch and a site switch relevant to CNAME handling for global server load balancing in accordance with one embodiment of the invention.

FIG. 3 is a block diagram showing the functional modules of GSLB switch 12 and site switch 18A (for instance) relevant to CNAME handing for the global server load balancing function in one embodiment. As shown in FIG. 3, GSLB switch 12 includes a GSLB switch controller 401, health check module 402, DNS proxy module 403, metric agent 404, routing metric collector 405, and site-specific metric collector 406. GSLB switch controller 401 provides general control functions for the operation of GSLB switch 12. Health check module 402 is responsible for querying, either periodically or on demand, host servers and relevant applications hosted on the host servers to determine the "health" (e.g., whether or not it is available) of each host server and each relevant application. Site-specific metric collector 406 communicates with metric agents in site-specific switches (e.g., FIG. 3 shows site-specific metric collector 406 communicating with site-specific metric agent 407 of a site server load balancing Serverlron or "SLB SI") to collect site-specific metrics (e.g., number of available sessions on a specific host server and/or connection-load data indicative of connections-per-second at that host server).

Routing metric collector 405 collects routing information from routers (e.g., topological distances between nodes on the Internet). FIG. 3 shows, for example, router 408 providing routing metric collector 405 with routing metrics (e.g., topological distance between the load balancing switch and the router), using the Border Gateway Protocol (BGP). DNS proxy module 403 (A) receives incoming DNS requests, (B) provides the host names to be resolved to DNS server 16, (C) receives from DNS server 16 a list of responsive IP addresses, (D) orders the IP addresses on the list received from DNS server 16 according to an embodiment of the present invention, using the metrics collected by routing-metric collector 405 and site specific collector 406, and values of any other relevant parameter, and (E) provides the ordered list of IP addresses to the requesting DNS server. Since GSLB switch 12 can also act as a site switch, GSLB switch 12 is provided site-specific metric agent 404 for collecting metrics for a site-specific metric collector.

One embodiment of the present invention provides a method to detect CNAME records from a DNS reply received from the authoritative DNS server 16. In an embodiment of the invention, this detection can be performed by the DNS proxy module 403 in cooperation with the switch controller 401 as needed. For example, since the DNS proxy module 403 is the component that receives incoming DNS replies from the authoritative DNS server 16, the DNS proxy module 403 can include or otherwise use a parser 409 (or other software component) to scan and identify (from the received DNS reply) a CNAME record, if any is present.

If a CNAME record is detected in the DNS reply, the CNAME record will typically point to or otherwise identify the A record (or host name) to which it maps, as is conventionally found in replies involving CNAME records. The DNS reply will also contain the list of IP addresses that corresponds to the A record and which is used by the CNAME record. If the host name for that A record has been configured for GSLB, then the GSLB switch 12 applies a GSLB algorithm to the list of IP addresses to reorder the list to identify the "best" IP address, and sends the reordered list to the client program 28.

If there is no CNAME record detected in the DNS reply, then the GSLB switch 12 applies the GSLB algorithm to the IP addresses for the A record in the reply, if the host name has been configured for GSLB. Otherwise if there is no CNAME record in the DNS reply and the host name specified in the DNS reply has not been configured for GSLB, then the GSLB algorithm is not applied to the list of IP addresses and is passed unaltered to the client program 28. In another situation, there may be a CNAME record in the GSLB reply but the A record (host name) that it points to has not been configured for GSLB. In this case, the GSLB algorithm is not applied to the list of IP addresses, and the list of IP addresses is sent to the client program 28 unaltered.

Figure 2:
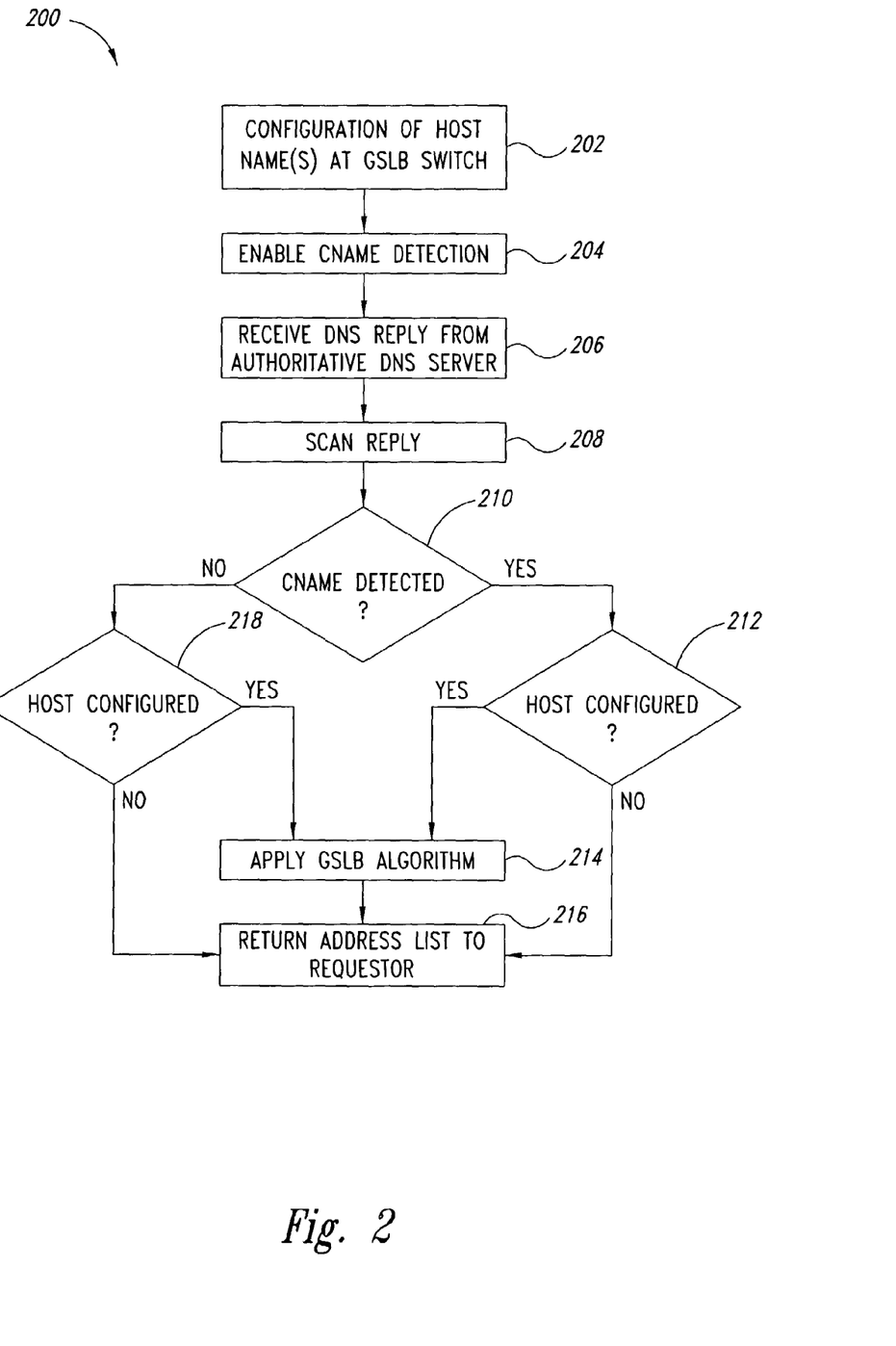
FIG. 2 illustrates in a flow chart one embodiment of a method for CNAME handling related to global server load balancing.

For example, FIG. 2 illustrates in a flow chart 200 one embodiment of a method for CNAME handling related to global server load balancing. At least some of the elements of the flowchart 200 may be embodied in software or other machine-readable instructions stored on one or more machine-readable media. Such machine-readable media may be at the GSLB switch 12 and work in conjunction with the various components illustrated for the GSLB switch 12 in FIG. 3.

Beginning first at a block 202, the host name(s) corresponding to one or more A records are configured at the GSLB switch 12. This configuration can include, for instance, identifying which host names are to be load balanced (e.g., have the GSLB algorithm applied to its IP address list). If a certain host name(s) is not configured for GSLB at the block 202, then the GSLB algorithm will not be applied to its list of IP addresses, and the list is sent unaltered to the requester, such as the client program 28. Therefore, this configuration capability gives a system administrator the flexibility to selectively load balance only certain domains and hosts.

Other configuration operations that can be performed at the block 202 can include enabling of the performance metrics, arranging the order in which the performance metrics are to be performed, correlating the performance metrics to the relevant host names or host servers, and so forth. The details of these configuration operations are not within the scope of this disclosure, and therefore will not be described further. Examples of such configuration details may be found in the technical documentation available at the web site www-.foundrynet.com.

At a block 204, the CNAME detection feature is enabled at the GSLB switch 204. This enabling may be performed by the system administrator using a command line interface (CLI) command, as one example. By default, the CNAME detection feature is disabled.

The CNAME detection feature can be enabled to detect CNAMES having different hosts but zones in common with the A record. Examples are the www1.foundrynet.com, www2.foundrynet.com, and www3.foundrynet.com CNAME records that all point to the A record www.foundrynet.com. In other embodiments, the CNAME detection feature can be enabled to detect CNAMES with the same hosts but slightly different domain name designations, such as www.foundrynetworks.com, www.foundrynet.org, and others. Detection of other CNAME variations (or combination of variations) is also possible.

In some implementations, the DNS replies received from the authoritative DNS server 16 will include in it the CNAME record, the actual host name (A record) that it points to, and the list of IP addresses corresponding to the actual host name. Therefore, no additional configuration need be performed at the GSLB switch 12 to correlate (such as via a lookup table) CNAMEs to an actual host name.

In implementations where only the CNAME and the list of IP addresses is included in the DNS reply received from the authoritative DNS server 16 (e.g., the actual host name cannot be determined directly from the DNS reply), configuration and population of a lookup table or other correlation mechanism at the GSLB switch 12 is performed so that the CNAME and/or IP addresses in the received DNS replies can be matched to an actual host name, for determination of whether that host name is configured for GSLB.

In yet other implementations, the DNS reply may only include the CNAME and a pointer to an external list of IP addresses and/or host names. In such cases, suitable correlation (such as via a lookup table) can be performed to locate the IP addresses and/or host names in order to perform the CNAME-handling processes described herein.

After enablement of the CNAME detection feature at the block 204, the GSLB switch 12 can receive DNS replies from the authoritative DNS server (or receive other communications for which CNAME handling may be applied, including a query that may specify a CNAME) at a block 206. The DNS reply will generally have a list of IP addresses corresponding to the actual host name. For situations that do not involve CNAMES, the DNS reply generally will have the IP addresses (and the actual host name). For situations that involve CNAMES, the DNS reply will have in it the CNAME, the IP addresses of the actual host name, and perhaps the actual host name itself.

As each DNS reply is received at the block 206 by the DNS proxy module 403, the parser 409 checks or scans through the DNS reply to detect CNAME records at a block 208. A record may be identified as being a CNAME record, for example, if within the DNS reply that record points to another address record. Alternatively or in addition, the address record(s) in the DNS reply may be compared with address records kept in a lookup table at the GSLB switch 12 to determine if the address record in the DNS reply pertains to a CNAME or an actual host name. It is appreciated that other CNAME detection techniques that would be familiar to a person skilled in the art having the benefit of this disclosure may be used.

If a CNAME record is detected at a block 210, then a determination is made at a block 212 as to whether the host name that it points to has been configured for GSLB. If the host name is determined to be configured for GSLB, then the GSLB algorithm is applied at a block 214 to the IP address list returned from the authoritative DNS server 16. The resulting reordered IP address list is then returned to the requestor (such as the client program 28 and/or the local DNS 30) at a block 216.

If at the block 212, however, it is determined that the host name is not configured for GSLB, then the GSLB algorithm is not applied to the IP address list. The IP address list is sent unaltered to the requestor at the block 216.

Back at the block 210, if no CNAME is detected in the DNS reply, then it need only be determined whether the actual host name corresponding to the IP address list in the DNS reply is configured for GSLB. This determination is performed at a block 218 (or 212), and involves checking the configuration settings made at the block 202 to confirm whether that actual host name is configured for GSLB.

If the actual host name is configured for GSLB, then the GSLB algorithm is applied to the IP address list at the block 214. Otherwise, the IP address list is returned unaltered to the requestor at the block 216.

With regards to the metrics that are applicable to the CNAME handling operations described above, the metrics used for the GSLB algorithm in the GSLB switch 12 in one embodiment include (a) the health of each host server and selected applications, (b) each site switch's session capacity threshold, (c) the round trip time (RTT) between a site switch and a client in a previous access, (d) the geographical location of a host server, (e) the connection-load measure of new connections-per-second at a site switch, (f) the current available session capacity in each site switch, (g) the "flashback" speed between each site switch and the GSLB switch (i.e., how quickly each site switch responds to a health check from the GSLB switch), and (h) a policy called the "Least Response Selection" (LRS) which prefers the site least selected previously. Many of these performance metrics can be provided default values. Each individual metric can be used in any order, such as an order of (a) through (h) identified above, and each metric can be disabled if desired. In one embodiment, the LRS metric is always enabled.

To briefly describe herein one embodiment of a GSLB algorithm (embodiments of which are described in further detail in the co-pending applications previously identified), assume for purposes of illustration that the metric order is (a) through (h) as identified above. Upon receiving the IP address list from the authoritative DNS server 16, GSLB switch 12 performs, for each IP address on the IP address list (e.g., host server 261 connected to site switch 18B), a layer 4 health check and a layer 7 check. Such a health check can be achieved, for example, by a "ping-like" operation defined under the relevant protocol, such as sending SYN/ACK packets under the TCP protocol. If a host server or an associated application fails any of the health checks it is disqualified from being the "best" site and may be excluded from the IP address list to be returned to client program 28.

If the resulting list of IP addresses has only one IP address, then the list of IP addresses is returned to client program 28. Otherwise if there are multiple IP addresses remaining, the IP address list is assessed under the next metric in the algorithm, which is the "capacity threshold" of the site switch serving that IP address. The virtual IP address configured at site switch 18B, for example, may be disqualified from being the "best" IP address if the number of sessions for switch 18B exceed a predetermined threshold percentage (e.g., 90%) of the maximum number of sessions that the site switch can serve. If the resulting list of IP addresses has only one IP address, then list of IP addresses is returned to client program 28.

If, however, the IP address list has multiple IP addresses, the remaining IP addresses on the list can then be reordered based upon a round-trip time (RTT) between the site switch for the IP address (e.g., site switch 18B) and the client (e.g., client 28). The RTT is computed (and stored), for instance, for the interval between the time when a client machine requests a TCP connection to a proxy server configured on a site switch, sending the proxy server a TCP SYN packet, and the time a site switch receives from the client program a TCP ACK packet. Again, if the top entries on the list of IP addresses do not have equal RTTs, the list of IP addresses is returned to client program 28.

If multiple sites have equal RTTs, then the list is reordered based upon the next metric in the GSLB algorithm, which is based on the location (geography) of the host server. The GSLB switch prefers an IP address that is in the same geographical region as the client machine in an embodiment. If the top two entries on the IP list are not equally ranked, the IP list is sent to the client program 28.

After using the geographic metric, if multiple sites are of equal rank for the best site, the IP addresses can then be reordered based upon site connection load. The connection-load metric feature allows comparison of sites based on the connection-load on their respective agent (e.g., at the metric agent 407 of the site ServerIron switch 18A in FIG. 3, for instance). The connection-load is a measure of new connections-per-second on the agent 407 in one embodiment. If a calculated average load is less than a specified load limit, the site is passed on to the next stage of the GSLB algorithm—otherwise that site is eliminated/rejected from the set of potential candidates.

If there are no multiple candidates at the top of the IP list that have passed the connection-load metric (or there are none of equal rank), then the IP address list is sent to the client program 28. If multiple sites are of equal rank for the best site, the IP addresses can then be reordered based upon available session capacity, which is the next metric in the GSLB algorithm. For example in one embodiment, if switch 18A has 1,000,000 sessions available and switch 22B has 800,000 sessions available, switch 18A is then preferred, if a tolerance limit, representing the difference in sessions available expressed as a percentage of capacity in the larger switch, is exceeded. If an IP address is preferred, the IP address will be placed at the top of the IP address list, and is then returned to the requesting entity. Otherwise, if the session capacity does not resolve the best IP address, then resolution is based upon a "flashback" speed. The flashback speed is a time required for a site switch to respond to layers 4 and 7 health checks by the GSLB switch in one embodiment. The preferred IP address will correspond to a flashback speed exceeding the next one by a preset tolerance limit.

If a best IP address is resolved, the IP address list is sent to client program 28. Otherwise, an IP address in the site that is least often selected to be the "best" site (e.g., the LRS metric) is chosen. The IP address list is then sent to client program 28. Upon receipt of the IP address list, the client program 28 uses the best IP address selected (i.e., the top of the list) to establish a TCP connection with a host server.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention and can be made without deviating from the spirit and scope of the invention.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method of providing load balancing in a network, the method comprising:
   receiving, by a load balance switch, a domain name system (DNS) reply to a DNS query to resolve a name into a network address;
   checking, by said load balance switch, the received DNS reply for an alias associated with a canonical name (CNAME) record; and
   if the alias associated with the CNAME record is detected in said received DNS reply by said checking and if a host name that is mapped to by the alias is configured for load balancing, applying by said load balance switch a load balancing algorithm to a list of network addresses provided by the received DNS reply.

2. The method of claim 1, further comprising:
   if the alias associated with the CNAME record is detected by said checking, determining by said load balance switch if said host name that is mapped to by the alias is configured for load balancing,
   wherein said applying the load balancing algorithm to the list of network addresses is performed if the host name, associated with the list of network addresses, is said determined by said load balance switch to be configured for load balancing.

3. The method of claim 1 wherein the list of network addresses provided in the DNS reply includes virtual IP addresses.

4. The method of claim 1, further comprising sending by said load balance switch the list of network addresses, having the load balancing algorithm applied thereto, to a client program.

5. The method of claim 1 wherein said applying the load balancing algorithm includes arranging, by said load balance switch, the network addresses in said list based on a set of performance metrics.

6. The method of claim 2, further comprising if the host name is determined by said load balance switch not to be configured for load balancing, sending by said load balance switch the list of network addresses as a response to said DNS query without applying the load balancing algorithm to the list.

7. The method of claim 1, further comprising if the alias associated with the CNAME record is not detected by said checking:

determining by said load balance switch if said host name, which corresponds to said list of network addresses provided by the DNS reply, is configured for load balancing;

if that host name is determined by said load balance switch to be configured for load balancing, applying by said load balance switch the load balancing algorithm to said corresponding list of network addresses; and if that host name is determined by said load balance switch not to be configured for load balancing, sending by said load balance switch said corresponding list of network addresses, unaltered by the load balancing algorithm, as a response to said DNS query.

8. The method of claim 1, further comprising enabling said load balance switch to check said DNS reply for the alias associated with the CNAME record.

9. The method of claim 1 wherein the alias includes a common zone relative to the host name but a different host.

10. A method for providing load balancing in a network, the method comprising:

receiving, by a load balance switch, a domain name system (DNS) reply to a DNS query to resolve a name;

checking, by said load balance switch, the received DNS reply for an alias associated with a canonical name (CNAME) record;

if the alias associated with the CNAME record is detected in said received DNS reply by said checking, determining by said load balance switch if a host name that is mapped to by the alias is configured for load balancing; and if the host name is said determined to be configured for load balancing, arranging by said load balance switch a list of network addresses provided by the received DNS reply based on a set of performance metrics;

wherein if the host name is said determined not to be configured for load balancing, said load balance switch does not apply at least one of the performance metrics to said list of network addresses.

11. The method of claim 10, further comprising if the alias associated with the CNAME record is not detected in said received DNS reply by said checking:

determining, by said load balance switch, whether said host name, which corresponds to said list of network addresses provided by the received DNS reply is configured for load balancing; and if that host name is said determined to be configured for load balancing, applying by said load balance switch the load balancing algorithm to said list of network addresses;

wherein if that host name is said determined not to be configured for load balancing, said load balance switch does not alter said list of network addresses by the load balancing algorithm.

12. The method of claim 10 wherein the alias that maps to the host name includes a common zone relative to the host name but a different host.

13. The method of claim 10, further comprising at least one of enabling and disabling said load balance switch to check for the alias associated with the CNAME record.

14. The method of claim 10 wherein said determining if the host name that is mapped to by the alias is configured for load balancing includes:

identifying by the load balance switch the host name from within the received DNS reply; and checking by the load balance switch at least one configuration setting to determine if the identified host name is configured for load balancing.

15. The method of claim 10 wherein said determining if the host name that is mapped to by the alias is configured for load balancing includes:

if the host name is not indicated in the received DNS reply, identifying by the load balance switch the host name from the CNAME record; and checking by the load balance switch at least one configuration setting to determine if the identified host name is configured for load balancing.

16. The method of claim 10 wherein said checking the received DNS reply for the alias associated with the CNAME record includes identifying by said load balance switch the CNAME record in the received DNS reply as an address record that points to another address record.

17. An article of manufacture, comprising:

a storage medium having instructions stored thereon that are executable by a load balance switch to:

check, by said load balance switch, a domain name system (DNS) reply that is received by said load balance switch and that replies to a DNS query to resolve a names for an alias associated with a canonical name (CNAME) record; and if the alias associated with the CNAME record is detected in said received DNS reply by said check and if a host name that is mapped to by the alias is configured for load balancing, apply by said load balance switch a load balancing algorithm to a list of network addresses provided by the received DNS reply.

18. The article of manufacture of claim 17 wherein the storage medium further includes instructions stored thereon that are executable by said load balance switch to:

determine by said load balance switch if said host name that is mapped to by the alias is configured for load balancing, if the alias associated with the CNAME record is detected by said check, wherein said apply the load balancing algorithm to the list of network addresses is performed, if the host name, associated with the list of network addresses, is said determined by said load balance switch to be configured for load balancing.

19. The article of manufacture of claim 17 wherein the storage medium further includes instructions stored thereon that are executable by said load balance switch to:

send by said load balance switch the list of network addresses, having the load balancing algorithm applied thereto, to a client program.

20. The article of manufacture of claim 17 wherein the instructions to apply the load balancing algorithm to the list of network addresses include instructions executable by said load balance switch to:

arrange by said load balance switch the network addresses as an ordered list based on a set of performance metrics.

21. The article of manufacture of claim 18 wherein the storage medium further includes instructions stored thereon that are executable by said load balance switch to:

send the list of network addresses without applying the load balancing algorithm to the list, if the host name is said determined not to be configured for load balancing.

22. The article of manufacture of claim 17 wherein the storage medium further includes instructions stored thereon that are executable by said load balance switch to, if the alias associated with the CNAME record is not detected by said check:

determine by said load balance switch if said host name corresponding to said list of network addresses provided by the received DNS reply is configured for load balancing;

if that host name is said determined to be configured for load balancing, apply by said load balance switch the load balancing algorithm to said list of network addresses, wherein if that host name is said determined not to be configured for load balancing, said load balance switch does not alter said list of network addresses with the load balancing algorithm.

23. An apparatus to provide load balancing in a network, the apparatus comprising:

a load balance switch including:

a proxy module to receive domain name system (DNS) reply to a DNS query to resolve a name;

a parser in cooperation with the proxy module to check the received DNS reply for an alias associated with a canonical name (CNAME) record; and a controller coupled to the proxy module and to the parser, the controller being operative to, if the alias associated with the CNAME record is detected in said received DNS reply by the parser and if a host name that is mapped to by the alias is configured for load balancing, apply a load balancing algorithm to a list of network addresses provided by the received DNS reply.

24. The apparatus of claim 23 wherein the DNS reply to the DNS query is received by the proxy module from an authoritative domain name server.

25. The apparatus of claim 23 wherein the controller is further operative to determine if said host name that is mapped to by the alias is configured for load balancing.

26. The apparatus of claim 25 wherein the controller is further operative to send the list of network addresses, via the proxy module, without application of the load balancing algorithm to the list, if the host name is determined by the controller to not be configured for load balancing.

27. The apparatus of claim 23 wherein the load balancing algorithm includes an arrangement of the network addresses provided by the received DNS reply as an ordered list based on a set of performance metrics.

28. The apparatus of claim 23 wherein the controller is further operative to, if the alias associated with the CNAME record is not detected in said received DNS reply by said parser, determine if said host name, which corresponds to said list of network addresses provided by the received DNS reply, is configured for load balancing, wherein:

if that host name is said determined to be configured for load balancing by the controller, the controller is operative to apply the load balancing algorithm to said list of network addresses, and wherein:

if that host name is determined not to be configured for load balancing by the controller, the controller is operative to send said list of network addresses, unaltered by the load balancing algorithm, to a client program.

29. The article of manufacture of claim 17 wherein the instructions to apply said load balancing algorithm to said list of network addresses includes instructions executable by said load balance switch to:

place, by said load balance switch, a preferred network address at a top of said list of network addresses, the storage medium further including instructions stored thereon that are executable by said load balance switch to:

provide, by said load balance switch, said list of network addresses, having said preferred network address placed at the top, to a client program.

* * * * *

UNITED STATES PATENT AND TRADEMARK OFFICE
CERTIFICATE OF CORRECTION

PATENT NO. : 7,574,508 B1
APPLICATION NO. : 10/214921
DATED : August 11, 2009
INVENTOR(S) : Sunanda Lakshmi Kommula It is certified that error appears in the above-identified patent and that said Letters Patent is hereby corrected as shown below:

Column 11, line 44, "DNS reply is configured" should read --DNS reply, is configured--.

Column 12, line 20, "resolve a names for" should read --resolve a name, for--.

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

PATENT NO.         : 7,574,508 B1
APPLICATION NO.    : 10/214921
DATED              : August 11, 2009
INVENTOR(S)        : Sunanda Lakshmi Kommula It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 990 days.

Signed and Sealed this

Seventh Day of September, 2010

David J. Kappos
*Director of the United States Patent and Trademark Office*

(12) EX PARTE REEXAMINATION CERTIFICATE (9199th)
United States Patent
Kommula (10) Number: US 7,574,508 C1
(45) Certificate Issued: Aug. 14, 2012

(54) CANONICAL NAME (CNAME) HANDLING FOR GLOBAL SERVER LOAD BALANCING

(75) Inventor: Sunanda Lakshmi Kommula, San Jose, CA (US)

(73) Assignee: Brocade Communications Systems, Inc., San Jose, CA (US)

Reexamination Request:
No. 90/011,764, Jun. 27, 2011

Reexamination Certificate for:
Patent No.: 7,574,508
Issued: Aug. 11, 2009
Appl. No.: 10/214,921
Filed: Aug. 7, 2002

Certificate of Correction issued Mar. 16, 2010.

Certificate of Correction issued Sep. 7, 2010.

(51) Int. Cl.
*G06F 15/173* (2006.01)

(52) U.S. Cl. .......................................... 709/226
(58) Field of Classification Search .................. None
See application file for complete search history.

(56) References Cited

To view the complete listing of prior art documents cited during the proceeding for Reexamination Control Number 90/011,764, please refer to the USPTO's public Patent Application Information Retrieval (PAIR) system under the Display References tab.

*Primary Examiner* — Mary Steelman (57) ABSTRACT

Canonical name (CNAME) handling is performed in a system configured for global server load balancing (GSLB), which orders IP addresses into a list based on a set of performance metrics. When the GSLB switch receives a reply from an authoritative DNS server, the GSLB switch scans the reply for CNAME records. If a CNAME record is detected and it points to a host name configured for GSLB, then a GSLB algorithm is applied to the reply. This involves identifying the host name (pointed to by the CNAME record) in the reply and applying the metrics to the list of returned IP addresses corresponding to that host name, to reorder the list to place the "best" IP address at the top. If the CNAME record in the reply points to a host name that is not configured for GSLB, then the GSLB sends the reply unaltered to the inquiring client.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1 and 17 is confirmed.

Claims 2-16 and 18-29 were not reexamined.

* * * * *

US007574508C1

(12) INTER PARTES REEXAMINATION CERTIFICATE (713th)

United States Patent
Kommula (10) Number: US 7,574,508 C1
(45) Certificate Issued: Oct. 24, 2013

(54) CANONICAL NAME (CNAME) HANDLING FOR GLOBAL SERVER LOAD BALANCING

(75) Inventor: Sunanda Lakshmi Kommula, San Jose, CA (US)

(73) Assignee: Brocade Communications Systems, Inc., San Jose, CA (US)

Reexamination Request:
No. 95/001,804, Nov. 4, 2011

Reexamination Certificate for:
Patent No.: 7,574,508
Issued: Aug. 11, 2009
Appl. No.: 10/214,921
Filed: Aug. 7, 2002

Certificate of Correction issued Mar. 16, 2010
Certificate of Correction issued Sep. 7, 2010

(51) Int. Cl.
*G06F 15/173* (2006.01)

(52) U.S. Cl.
USPC .......................................................... 709/226

(58) Field of Classification Search
None
See application file for complete search history.

(56) References Cited

To view the complete listing of prior art documents cited during the proceeding for Reexamination Control Number 95/001,804, please refer to the USPTO's public Patent Application Information Retrieval (PAIR) system under the Display References tab.

*Primary Examiner* — Mary Steelman (57) ABSTRACT

Canonical name (CNAME) handling is performed in a system configured for global server load balancing (GSLB), which orders IP addresses into a list based on a set of performance metrics. When the GSLB switch receives a reply from an authoritative DNS server, the GSLB switch scans the reply for CNAME records. If a CNAME record is detected and it points to a host name configured for GSLB, then a GSLB algorithm is applied to the reply. This involves identifying the host name (pointed to by the CNAME record) in the reply and applying the metrics to the list of returned IP addresses corresponding to that host name, to reorder the list to place the "best" IP address at the top. If the CNAME record in the reply points to a host name that is not configured for GSLB, then the GSLB sends the reply unaltered to the inquiring client.

INTER PARTES REEXAMINATION CERTIFICATE ISSUED UNDER 35 U.S.C. 316

NO AMENDMENTS HAVE BEEN MADE TO THE PATENT

AS A RESULT OF REEXAMINATION, IT HAS BEEN DETERMINED THAT:

The patentability of claims 1-6, 8, 9, 17, 19, 20 and 29 is confirmed.

Claims 7, 10-16, 18 and 21-28 were not reexamined.

* * * * *